United States Patent [19]

Cordova et al.

[11] Patent Number: 4,695,509

[45] Date of Patent: Sep. 22, 1987

[54] POLYAMIDE FIBER REINFORCEMENT IN THERMOSET POLYURETHANE COMPOSITES

[75] Inventors: Colleen W. Cordova, Midlothian, Va.; Hugh H. Rowan, Chapel Hill, N.C.

[73] Assignee: Allied Corporation, Morris Township, Morris County, N.J.

[21] Appl. No.: 812,581

[22] Filed: Dec. 23, 1985

[51] Int. Cl.$^4$ ............................................. B32B 27/40
[52] U.S. Cl. ................................... 428/267; 264/257; 428/290; 428/423.5
[58] Field of Search ...................... 428/267, 290, 423.5; 524/114; 264/257

[56] References Cited

U.S. PATENT DOCUMENTS 4,233,359 11/1980 Mimura et al. ...................... 428/267
4,302,493 11/1981 Tanaka et al. ...................... 428/267
4,501,790 2/1985 Aizawa et al. ...................... 428/283

Primary Examiner—Marion C. McCamish

[57] ABSTRACT

Fiber-reinforced thermoset polyurethane composites display enhanced impact strength when sufficient amounts of a high tenacity aliphatic polyamide fiber characterized by a drawn denier of 4 to 8 denier per filament; a thermal shrinkage of up to about 14 percent; an elongation of from less than 28 percent; and a tenacity of at least 5.5, preferably at least 7 grams per denier, are incorporated into the composite. The process of producing such composites, including reinforced reaction injection molding processes, resin transfer molding processes, and casting process are improved by a reduction in equipment wear resulting from the incorporation of the specified polyamide fiber.

8 Claims, No Drawings

POLYAMIDE FIBER REINFORCEMENT IN THERMOSET POLYURETHANE COMPOSITES

FIELD OF THE INVENTION

The invention relates to fiber-reinforced thermoset polyurethane molded composites. By incorporating a sufficient amount of specified polyamide fibers, impact strength of the finished composite is substantially enhanced.

DESCRIPTION OF THE PRIOR ART

Fiber-reinforced thermoset polyurethane systems have been gaining widespread acceptance in composite applications. Urethane moldings containing up to 25 percent by weight of glass fibers having lengths within the range of 1/16 inch to ⅛ inch as reinforcing fibers, prepared, for example, by reinforced-reaction injection molding are disclosed in U.S. Pat. No. 4,501,790 to Aizawa et al. Additional prior art indicates the widespread use of fiberglass reinforcement in molded polyurethane composites.

However, glass fibers in greater reinforcing lengths, for example ⅛ inch to 1 inch, have been found to be extremely difficult to use in injection molding type equipment. Utilizing milled glass fiber or flake of the size that can be accommodated in injection molding equipment, although giving improvements in selected properties, has several disadvantages. It advances wear in the equipment, improvement in impact strength is limited by the small size of the reinforcement, poor surface finishes may result, and the potential for reduction of parts weight is limited.

SUMMARY OF THE INVENTION

Fiber-reinforced thermoset polyurethane composites display enhanced impact strength when sufficient amounts of a high tenacity aliphatic polyamide fiber characterized by a drawn denier of 4 to 8 denier per filament; a thermal shrinkage of up to about 14 percent; an elongation of less than 28 percent; and a tenacity of at least 5.5, preferably at least 7 grams per denier, are incorporated into the composite. The process of producing such composites, including reinforced reaction injection molding processes, resin transfer molding processes, and casting processes are improved by a reduction in equipment wear resulting from the incorporation of the specified polyamide fiber.

DESCRIPTION OF THE PREFERRED EMBODIMENT

Molded thermoset polyurethane composites are found to have enhanced impact strength when reinforced with a sufficient amount of a high tenacity aliphatic polyamide fiber characterized by a drawn denier of 4 to 8 denier per filament; a thermal shrinkage of up to about 14 percent; an elongation of less than 28 percent; and a tenacity of at least 5.5, preferably at least 7 grams per denier.

The polyamide fiber can be in the form of cut fiber, nonwoven mats, and woven or nonwoven fabric.

The fiber is preferably treated with a coupling agent or finish to enhance compatibility and bonding with the polyurethane resin. A preferred surface treatment is disclosed in U.S. Ser. No. 624,897 filed June 27, 1984. The reinforcing aliphatic polyamide fiber disclosed therein is treated with a composition consisting essentially of an organofunctional silane in an amount sufficient to achieve 0.02 to 1.0, preferably 0.1 to 0.5, weight percent of the silane on the fiber, and a diluent which provides for the hydrolysis of the silane to a silanol. The treating composition consists essentially of 1 to 50, preferably 3 to 25, weight percent of the silane; up to 1 weight percent of a wetting agent; and 49 to 99, preferably 74 to 97, weight percent of the diluent. The organofunctional silane coupling agent is selected from the group consisting of
Vinyl-tris(beta-methoxyethoxy)silane;
gamma-Methacryloxypropyltrimethoxysilane;
beta(3,4-Epoxycyclohexyl)ethyltrimethoxysilane;
gamma-Mercaptopropyltrimethoxysilane;
gamma-Aminopropyltriethoxysilane;
N-beta(aminoethyl)-gamma-aminopropyltrimethoxysilane; and

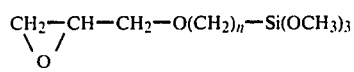

wherein n is 2 and 5; and combinations thereof.

The preferred silane is gamma-glycidoxypropyltrimethoxysilane. The preferred diluent is water.

Suitable reinforcing polyamides include, for example, those prepared by condensation of hexamethylene diamine and adipic acid, condensation of hexamethylene diamine and sebacic acid known as nylon 6,6 and nylon 6,10, respectively, condensation of bis(para-aminocyclohexyl)methane and dodecanedioic acid, or by polymerization of 6-caprolactam, 7-aminoheptanoic acid, 8-caprylactam, 9-aminopelargonic acid, 11-aminoundecanoic acid, and 12-dodecalactam, known as nylon 6, nylon 7, nylon 8, nylon 9, nylon 11, and nylon 12, respectively.

Cross-linked rigid thermoset polyurethane polymers are known in the art and are made with higher functional monomers than the monomers used to produce thermoplastic polyurethanes. The higher functionality is obtained with higher functional isocyanates, so-called polymeric isocyanates, or with higher functional polyols. Examples of isocyanates commonly used in the thermosetting polyurethane systems include toluene diisocyanate (TDI), polymethylene polyphenyl isocyanate (PMDI), and 4,4'methylene bis(phenylisocyanate) (MDI).

Cut fiber can be concurrently mixed with a polyol, an organic polyfunctional isocyanate and a curing agent or the fiber can be mixed and stirred with prepolymer wherein a polyol and an organic polyfunctional isocyanate have been reacted or with the prepolymer immediately after the addition of a curing agent, while prior to curing. The fluid composition with reinforcing fiber is then introduced into a mold and the polyurethane resin is cured.

Alternatively, transfer molding can be utilized. The reinforcement fiber in the form of cut or continuous mats or fabric can first be placed in the mold, then the polyol/isocyanate/ curing agent be charged to the mold.

Reaction-injection molding (RIM) can be utilized to form composites of this invention by rapid injection of metered liquid streams of polyol and an isocyanate into a mold, which is then cured. The reinforcing fiber in the form of cut lengths can be first mixed with either the polyol component, the isocyanate component or both. The two liquid streams are brought together in a mixing head where they are mixed before entering the mold. The use of longer cut fiber length provides enhanced impact strength in the final composite. By the use of the polyamide fibers of this invention it is possible to use longer fibers in the composite than would be possible with glass fibers. For example polyamide fibers with a cut length of at least 0.125 inches have been successfully processed in liquid feed equipment.

Cast elastomers are cross-linked thermoset polymers based on TDI and MDI. The polyols can be polyethers or polyesters. Cast polyurethane elastomers are prepared by the one-shot method from MDI prepolymers or partial prepolymers. In the high speed RIM casting of automotive polyurethane elastomers, isocyanate and polyol plus extender are mixed before reacting.

The polyamide fibers of this invention may be incorporated into the polyurethane resin prior to curing in the manner shown in the examples. Hybrid mixtures of glass fibers and polyamide fibers can be utilized to achieve desired balance of properties. Fillers including mica, clay, silica, calcium carbonate, alumina, calcium silicate, carbon black, and titanium dioxide may typically be incorporated into the composite for their expected properties. Foaming agents may be incorporated into the process in known ways to produce a foamed product.

EXAMPLES

In the examples which follow, an instant set polymer rigid polyurethane resin available as Chempol 35-0305/35-0405 from Freeman Chemical Corporation, Port Washington WI was utilized to prepare reinforced plaques.

Reinforcement fibers utilized included E-glass and a high tenacity nylon 6 reinforcing fiber available from Allied Corporation as COMPET ™ Type IR69 reinforcing fiber with the following properties: $140 \times 10^3$ psi tensile strength, 20 percent extension at break, $0.75 \times 10^6$ psi Young's modulus, 12.0 percent shrinkage at 350° F. (177° C.), 23 microns diameter. The nylon 6 reinforcing fiber is surface treated to enhance adhesion and compatibility of the fiber with the resin matrix. The fibers were used in the form of cut fibers, nonwoven mats and woven fabrics as described below.

EXAMPLE 1

Hand lay-up plaques were prepared with the following reinforcement: Nylon 6 reinforcing fiber mats made from 1-inch cut nylon fiber (3 and 4.3 ounces per square yard); glass mats of continuous fiber construction (7 and 14 ounces per square yard); nylon 6 fabric constructed of 1260 denier continuous nylon fiber in a 3×3 basket weave (16 ounces per square yard); glass fabric, plain weave (10 ounces per square yard). Reinforcement loadings were based on weight. The plaques were prepared by placing the reinforcement in an open mold which was preheated to 200° F. Degassed, premixed polyurethane resin components were poured in. The mold was closed and held at a slight positive pressure to squeeze out excess resin and entrapped air, until cured. The full cycle, resin mixing to demolding, was on the order to 7 minutes. Plaques were prepared with a combination of glass and nylon 6 reinforcement. Additionally, a plaque was prepared utilizing nylon 6 textile fiber prepared into a staple mat made from 1-inch cut fiber, the textile fiber characterized by 6.4 to 16 denier per filament, an elongation of 45 to 75 percent, a tenacity of 3 to 5 grams per denier. The cured plaques were tested for notched Izod impact strength, flexural strength, and flexural modulus. Results are provided below in Table 1.

Nylon 6 reinforcing fiber mat and fabric gave improved impact strength over the unfilled polyurethane resin control, the glass mat and fabric reinforced plaques, and the nylon 6 textile fiber staple mat. With a 2 percent loading of nylon 6 mat, impact strength increases more than 300 percent. With a 3 percent loading of continuous glass mat, impact strength improved slightly less than 100 percent over that of the control. At increased nylon 6 mat loadings, the improvements in impact strength are more pronounced.

At higher fiber loadings, fabric was more convenient to work with than mat. At equivalent loadings, fabric and mat plaques exhibited similar impact properties. High loadings for nylon 6 reinforcing fiber showed substantially enhanced impact values.

EXAMPLE 2

Cut fiber reinforcement, specified in Table 2, was added to the degassed polyol component and allowed to stand for several minutes to provide good wetout. The two components of the polyurethane resin system were mixed and poured into the preheated mold used in Example 1. The mold was closed as in Example 1 and the resin cured. Impact strengths for the resulting plaques are shown in Table 2.

Adding 5 percent glass only slightly improved impact value over the unreinforced control. Substantial improvement is shown for nylon 6 cut fiber.

EXAMPLE 3

Cut polyester fiber reinforcement was added to the degassed polyol component as in Example 2. The polyester fiber had been surface treated in a manner similar to the nylon fiber of Example 2. The polyester fiber proved very difficult to wetout when mixed with resin and unacceptable product resulted.

EXAMPLE 4

A liquid injection system was utilized to produce reinforced molded plaques. Chopped nylon 6 fibers were placed in the polyol component of the polyurethane resin system. The polyol component and the isocyanate component were degassed, mixed via a static mixer and injected into a heated mold. The ratio of isocyanate to polyol was 3 to 1. On curing the plaques were removed from the mold and allowed to cool under pressure on a flat surface. Subsequent plaques were made by placing chopped reinforcement fiber into the isocyanate component. Plaques with a total 5 percent weight loading of nylon 6 fiber ⅛-inch length were successfully processed.

TABLE 1

| | PLAQUE PHYSICAL PROPERTIES | | | | |
|---|---|---|---|---|---|
| Plaque Construction | No. of Layers | Loading (Wt %) | Notched Izod Impact Strength (Ft Lb/ In Notch) | Flexural Strength × 10³ (psi) | Flexural Modulus × 10³ (psi) |
| Control[1] | 0 | — | 0.8 | 11.4 | 266 |
| Glass Mat | 1 | 2.9 | 1.5 | — | — |
| Glass Mat | 1 | 6.6 | 3.3 | 13.4 | 371 |
| Glass Fabric | 1 | 4.4 | 2.1 | 11.1 | — |
| Glass Fabric | 3 | 13.2 | 4.7 | 14.0 | — |
| Nylon 6 Mat[2] | 1 | 1.4 | 2.3 | 10.8 | 295 |
| Nylon 6 Mat | 1 | 2.0 | 3.5 | 10.4 | 292 |

TABLE 1-continued

PLAQUE PHYSICAL PROPERTIES

| Plaque Construction | No. of Layers | Loading (Wt %) | Notched Izod Impact Strength (Ft Lb/In Notch) | Flexural Strength × 10³ (psi) | Flexural Modulus × 10³ (psi) |
|---|---|---|---|---|---|
| Nylon 6 Mat | 3 | 4.2 | 5.1 | 10.0 | 285 |
| Nylon 6 Fabric | 1 | 5.2 | 5.5 | 10.2 | 283 |
| Nylon 6 Fabric | 3 | 15.7 | 25.0 | 10.6 | 302 |
| Nylon 6 Fabric | 5 | 26.0 | 26.6 | 6.8 | 247 |
| Glass Mat/ | 1 | 6.6 | 4.2 | 10.5 | 318 |
| Nylon 6 Mat | 1 | 1.4 | | | |
| Glass Mat/ | 1 | 3.3 | 3.0 | 9.2 | 309 |
| Nylon 6 Mat | 1 | 1.4 | | | |
| Nylon 6 Mat/ | 1 | 1.4 | | | |
| Glass Mat/ | 1 | 3.3 | 5.0 | 8.7 | 283 |
| Nylon 6 Mat | 1 | 1.4 | | | |
| Nylon 6 Fabric/ | 1 | 5.2 | | | |
| Glass Mat/ | 1 | 6.6 | 18.7 | 5.8 | 196 |
| Nylon 6 Fabric | 1 | 5.2 | | | |
| Nylon 6 Staple Mat[3] | 1 | 5.0 | 1.9 | 8.7 | 273 |

[1]Unreinforced polyurethane resin
[2]COMPET ™ -N nylon 6 Type IR69 reinforcing fiber available from Allied Corporation.
[3]Prepared from nylon 6 textile fiber characterized by 6.4 to 16 denier per filament, elongation 45 to 75%, and a tenacity of 3 to 5 grams per denier.

TABLE 2

CUT FIBER REINFORCEMENT IMPACT PROPERTIES

| Plaque Reinforcement | Notched Izod Impact Strength (Ft Lb/In-Notch) |
|---|---|
| Control (No reinforcement) | 0.8 |
| 5% 1/16 Inch Milled Glass | 0.9 |
| 5% ⅛ Inch Glass | 0.9 |
| 2% ¼ Inch Nylon | 1.2 |
| 5% ⅛ Inch Nylon | 1.3 |
| 5% ¼ Inch Nylon | 2.1 |
| 5% ½ Inch Nylon | 4.1 |

What is claimed is:

1. A fiber-reinforced thermoset polyurethane molded composite characterized by improved impact strength comprising molded thermoset polyurethane matrix reinforced with high tenacity polyamide fiber in an amount sufficient to provide said composite with said improved impact strength, said polyamide fiber characterized by a drawn denier of 4 to 8 denier per filament; a thermal shrinkage of up to about 14 percent; an elongation of less than 28 percent; and a tenacity of at least 5.5 grams per denier.

2. The composite of claim 1 wherein said polyamide fiber has a tenacity of at least 7 grams per denier.

3. The composite of claim 2 wherein said polyamide fiber is cut fiber having a length of at least 0.125 inch.

4. The composite of claim 2 wherein said polyamide fiber is in the form of nonwoven matt.

5. The composite of claim 2 wherein said polyamide fiber is in the form of fabric.

6. A process for the production of the composite of claim 1 comprising placing said polyamide fiber in the form of nonwoven mat or fabric into a mold; introducing a charge into the mold comprising a polymeric isocyanate, polyol, and curing agent; and curing to form said composite.

7. A process for the production of the composite of claim 1 comprising:
   (a) mixing said polyamide fiber in the form of cut fiber with at least one starting component for the production of thermoset polyurethane;
   (b) blending starting components for the production of thermoset polyurethane including the fiber-containing component of (a);
   (c) introducing said blend of starting components into a closed mold;
   (d) and curing to form said composite.

8. The process of claim 7 wherein said cut fiber has a length of at last 0.125 inch.

* * * * *